Feb. 8, 1949. W. D. HERSHBERGER 2,461,213
DISTANCE MEASURING DEVICE
Filed June 16, 1939
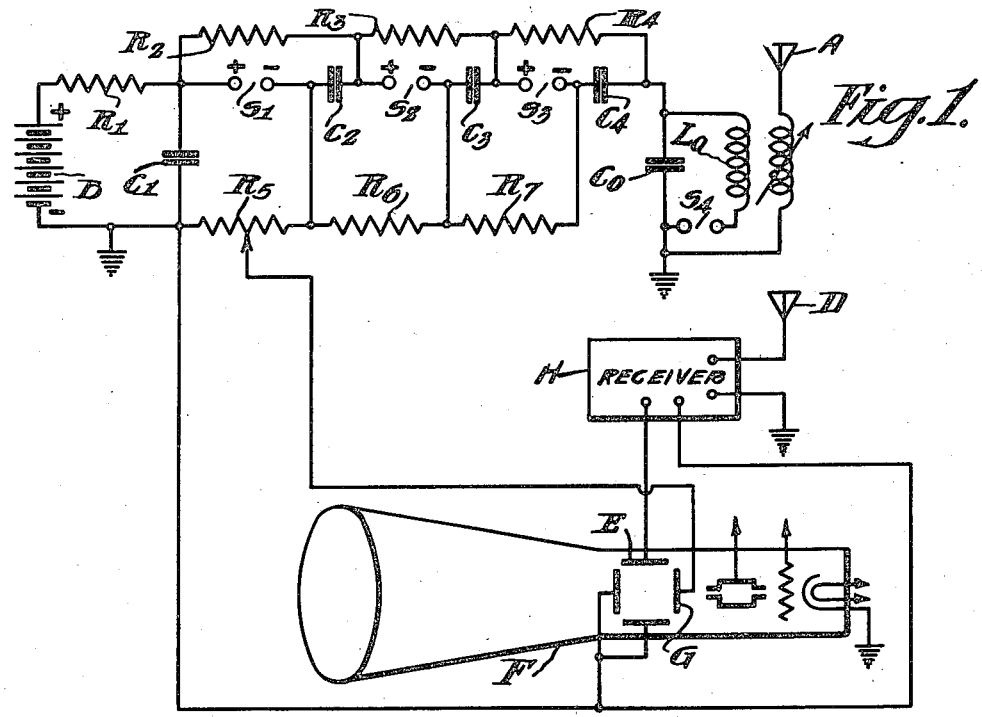
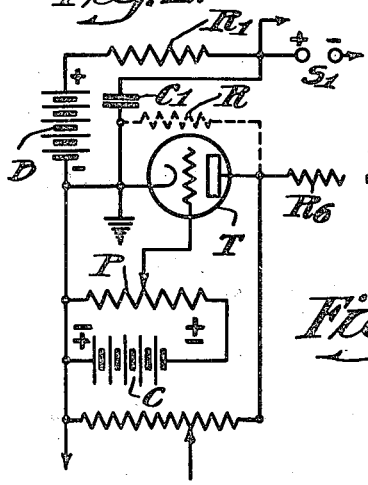
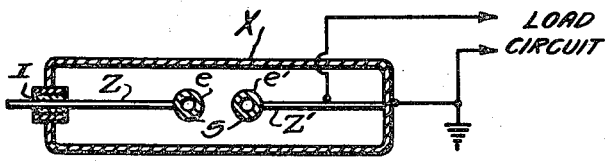
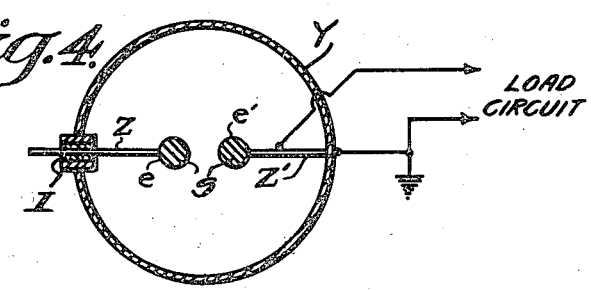
Inventor
William D. Hershberger
By
Attorney Patented Feb. 8, 1949

2,461,213

UNITED STATES PATENT OFFICE 2,461,213

DISTANCE MEASURING DEVICE

William D. Hershberger, Haddonfield, N. J., assignor to Radio Corporation of America, a corporation of Delaware Application June 16, 1939, Serial No. 279,585

4 Claims. (Cl. 343—13)

This invention relates to distance-measuring devices of the type in which a pulse of radio frequency energy is radiated toward an object whose distance is to be measured and in which the distance is indicated by the time interval between the transmission and the reception of the reflected pulse. More specifically, the invention relates to a simplified apparatus for generating damped wave trains or pulses of radio frequency energy and for timing the intervals between the pulses.

Numerous devices or systems for measuring distance as a function of the time required for a wave train to travel to a reflecting object and back to the observation point have been proposed. In general, such systems have been complicated by the generators and timing devices employed. For example, it has been customary to use thermionic tubes for pulse generation, thermionic tubes for amplifying or shortening the pulse, thermionic tubes for generating the high frequency waves, and thermionic tubes for generating or amplifying the timing wave. The thermionic tubes, while serving the desired purpose, require complicated circuits and heavy auxiliary equipment and, in the final analysis, are not very efficient. These undesirable characteristics are especially burdensome when the devices are designed for aircraft use.

One of the objects of the present invention is the provision of means for the efficient generation of pulses of radio frequency energy. Another object is to provide means for generating alternately pulses of radio frequency energy and timing waves. Another object is to provide means for generating alternately pulses of radio frequency energy and timing waves of linear or non-linear characteristics. An additional object is in the provision of means for and a method of generating and radiating pulses of radio frequency energy and of indicating the time interval between the radiation and the reception of a reflected pulse.

The invention will be described by reference to the accompanying drawings in which Figure 1 is a schematic circuit diagram of one embodiment of the invention; Figure 2 is a circuit diagram of a modification; and Figures 3 and 4 are sectional views of the oscillatory circuit of the generator. Similar reference numerals are used to indicate similar elements in the several views.

A source B of high voltage is connected through a resistor $R_1$ to a capacitor $C_1$. The source is also connected through resistors $R_1$, $R_2$, $R_5$ to a second capacitor $C_2$; and through resistors $R_1$, $R_2$, $R_3$, $R_5$, $R_6$ to a third capacitor $C_3$; and through resistors $R_1$, $R_2$, $R_3$, $R_4$, $R_5$, $R_6$ and $R_7$ to a fourth capacitor $C_4$. The capacitors $C_1$, $C_2$, $C_3$, $C_4$ are serially connected by spark gaps $S_1$, $S_2$, $S_3$. A final spark gap $S_4$ is connected to discharge an oscillatory circuit $L_0C_0$ which is connected across the last spark gap. The capacitor $C_0$ may be omitted if the effective capacity of the series capacitors $C_1$, etc., has the correct value. The oscillatory circuit is coupled to an antenna A or other load circuit.

The input of a radio receiver H is connected to an antenna D; the output of the receiver is connected to the vertical deflecting electrodes E of a cathode ray tube F. The horizontal deflecting electrodes G are connected to the resistor $R_5$ or a portion thereof. The other electrodes of the cathode ray tube are connected to appropriate sources of potential which are not shown.

It may be seen that the several capacitors are charged in parallel and are discharged in series. The effect of this arrangement is to apply an "overvoltage" to the oscillatory circuit $L_0C_0$ which is connected across the final spark gap. The overvoltage has a very steep wave front and is thus especially adapted to exciting a powerful high frequency transient in the oscillatory circuit. Once excited, the oscillatory circuit produces a train of damped waves. The length of the wave train is controlled by the damping applied by the load or antenna circuit and by the ratio of reactance to resistance of the oscillatory circuit per se.

The capacitors $C_1$, etc., are so proportioned with respect to the resistors $R_1$, etc., the breakdown voltages of the gaps $S_1$, etc., and the voltage of the D.-C. source B, that the desired number of wave trains per second is obtained. The frequency of the wave trains is also dependent upon the recovery or deionization time of the spark gaps. By way of example, if the gaps are spherical and are .5 cm. in length, the breakdown potential will be of the order of 17,000 volts. Thus, with a D.-C. voltage source B of the order of 20,000 volts, the potential applied to the final gap will be about 50,000 volts, while the gap itself is adjusted to breakdown at 20,000 to 25,000 volts. Assuming that the capacity Co of the oscillatory circuit is 5μμf, the potential difference across the final gap is 50,000 volts, and the energy is dissipated in 10μ seconds, the average power during the 10μ second interval will be $$\frac{\Delta \omega}{\Delta t} = \frac{1/2 cv^2}{10^{-5}} \text{ watts} = 0.625 \text{ kilowatts}$$

Thus, the desirability of applying an overvoltage to shock excite the oscillatory circuit will be appreciated.

The charging current for the circuit of Fig. 1 will follow an exponential law and the time required for a charge-discharge cycle is preferably many times the duration of the damped wave train. Since distances are indicated as a function of the time required for a wave train to travel to a reflecting object and back to the receiver, it is convenient to derive a cathode ray sweep potential from one of the charging resistors, preferably $R_5$. The receiver output applies a second deflecting potential to the cathode ray tube to indicate the reception of the reflected wave train. The receiver may include a delay circuit, which is adjusted to make the initial pulse correspond with the beginning of the sweep.

In some cases, the exponential timing or distance scale may be undesirable. In these cases the scale may be made linear by substituting a thermionic tube T for the resistor $R_5$, as shown in Fig. 2. The grid of the tube may be biased, by means of a potentiometer P and a battery C, to obtain any desired cathode-anode impedance characteristic. Furthermore, the tube T may be shunted by a resistor R to thereby derive potentials of linear or non-linear timing for the cathode ray horizontal sweep.

Since radio distance-measuring devices are operated at ultra high frequencies, that is, 500 megacycles per second and upward, conventional oscillatory circuits are not entirely suitable. The preferred forms of ultra high frequency circuits for the instant invention are illustrated in Figs. 3 and 4. The former shows a concentric line type of circuit. The outer conductor may be a copper tube X within which the spark gap S formed between two spheroidal electrodes e, e', supported by conductors Z, Z', respectively, is arranged as shown. One of the spark gap leads Z' is grounded, the other Z is connected through suitable insulation I to the overvoltage charging circuit. The latter (Fig. 4) shows the circuit arranged in a spherical outer conductor Y within which the spark gap S formed between two spheroidal electrodes e, e' is supported by a grounded conductor Z' and a second conductor Z insulated by an insulator I from the sphere Y.

Thus the invention has been described as a radio distance indicating device in which the generator supplies both an "overvoltage" and a sweep voltage. The former is applied to shock excite an oscillatory circuit; the latter is applied to the sweep or timing circuit of a cathode ray tube. The timing potential may be made to follow a linear or non-linear function. The overvoltage device makes it possible to obtain larger amounts of pulse power than may be obtained conveniently by other means. While four discharge circuits have been described, it should be understood that any number may be employed. Likewise, the sweep voltage may be obtained from any portion of the overvoltage generator, for example, by a potentiometer across the first capacitor.

I claim as my invention:

1. A distance measuring device including a source of charging voltage, a plurality of serially connected capacitors and spark gaps, means for applying said charging voltage to said capacitors in parallel, an oscillatory circuit connected across the last of said spark gaps so that an overvoltage is applied to said oscillatory circuit, a cathode ray tube, said tube including ray deflecting elements, and means for deflecting said ray including connections to said charging voltage source.

2. A distance measuring system including a voltage generator, a plurality of serially connected capacitors and spark gaps, means for applying said voltage to said capacitors in parallel, an oscillatory circuit connected across the last of said spark gaps so that an overvoltage is applied to said oscillatory circuit, means for radiating damped wave trains established by applying said overvoltage to said circuit, a cathode ray tube including sweep electrodes, means for applying voltages derived from said generator to said electrodes to sweep said ray in synchronism with the radiating of said wave trains, and means for deflecting said ray at an angle to said sweep to indicate reception of reflected wave trains.

3. A distance measuring system including a voltage generator, a plurality of serially connected capacitors and spark gaps, means for applying said voltage to said capacitors in parallel, an oscillatory circuit connected across the last of said spark gaps so that an overvoltage is applied to said oscillatory circuit, means for radiating damped wave trains established by applying said overvoltage to said circuit, a cathode ray tube including sweep electrodes, means for applying voltages derived from said generator to said electrodes to sweep said ray in synchronism with the radiating of said wave trains, a radio receiver, and means connected to said receiver for deflecting said ray at an angle to said sweep to indicate reception of reflected wave trains.

4. A damped wave train device including a source of charging current, an oscillatory circuit, means for applying an overvoltage derived from said source to said circuit to generate damped wave trains, means including connections to said source for timing the intervals between wave trains, and a cathode ray tube including deflecting electrodes connected to said timing means and arranged to deflect said ray along a coordinate corresponding to said timing.

WILLIAM D. HERSHBERGER.

REFERENCES CITED

The following references are of record in the file of this patent:

UNITED STATES PATENTS

| Number | Name | Date |
|---|---|---|
| 767,993 | Stone | Aug. 16, 1904 |
| 781,606 | Hewitt | Jan. 31, 1905 |
| 1,599,596 | Spooner | Sept. 14, 1926 |
| 1,908,249 | Hund | May 9, 1933 |
| 1,924,156 | Hart | Aug. 29, 1933 |
| 1,982,271 | Turner | Nov. 27, 1934 |
| 2,055,883 | Terry | Sept. 29, 1936 |
| 2,103,090 | Piebanski | Dec. 21, 1937 |
| 2,143,035 | Smith | Jan. 10, 1939 |
| 2,178,074 | Jakel et al. | Oct. 31, 1939 |
| 2,185,292 | Candler et al. | Jan. 2, 1940 |
| 2,266,668 | Tubbs | Dec. 16, 1941 |